United States Patent
Schewitz

(10) Patent No.: US 6,401,938 B1
(45) Date of Patent: Jun. 11, 2002

(54) FILTER ELEMENT FOR A LIQUID FILTER USING A FILTRATION AID

(76) Inventor: Jonathan Schewitz, 82 Devereax Avenue, Vincent, East London, Cape Province (ZA)

( * ) Notice: Subject to any disclaimer, the term of this patent is extended or adjusted under 35 U.S.C. 154(b) by 0 days.

(21) Appl. No.: 09/633,504

(22) Filed: Aug. 7, 2000

(51) Int. Cl.⁷ ............................................... B01D 29/19
(52) U.S. Cl. ..................... 210/457; 210/487; 210/489; 210/497.01
(58) Field of Search ............................ 210/323.2, 457, 210/486, 487, 488, 497.01, 497.2, 499, 346, 489; 55/492

(56) References Cited

U.S. PATENT DOCUMENTS

| | | | | |
|---|---|---|---|---|
| 3,591,010 A | * | 7/1971 | Pall ......................... | 210/493.1 |
| 4,247,394 A | * | 1/1981 | Schmidt, Jr. ................ | 210/767 |
| 4,443,346 A | * | 4/1984 | Muller ....................... | 210/785 |
| 5,736,045 A | * | 4/1998 | Bies et al. ............. | 210/497.01 |

* cited by examiner

Primary Examiner—Matthew O. Savage
(74) Attorney, Agent, or Firm—David W. Carstens; Carstens Yee & Cahoon LLP

(57) ABSTRACT

A liquid filter element frame is provided comprising an elongate injection moulded body having a plurality of support ribs radiating from a central axis thereof and a support ring encircling the outer edges of the ribs at the operatively lower end thereof. The ring has attached thereto a separately manufactured end disc having a smoothly contoured edge for supporting the lower end of a sleeve of filter fabric, in use. A sleeve made of filter fabric and adapted to be used as a cover for the element frame is also provided in which the operatively lower end and optionally also the upper end of the sleeve is made of a double layer of filter fabric. The frame fits within the sleeve in use.

4 Claims, 2 Drawing Sheets

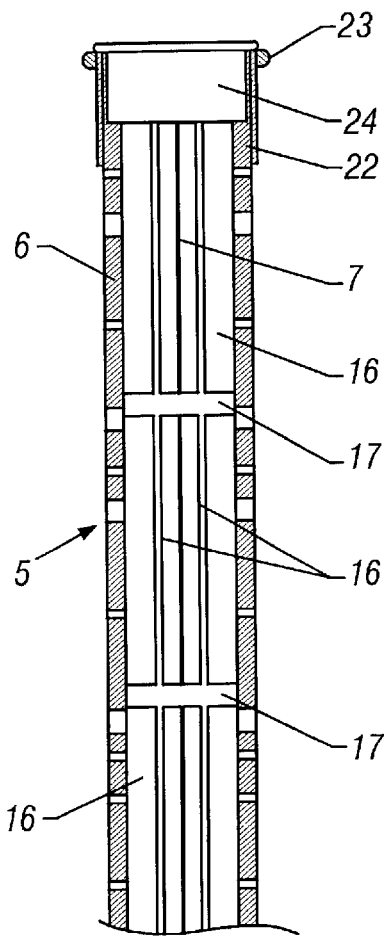
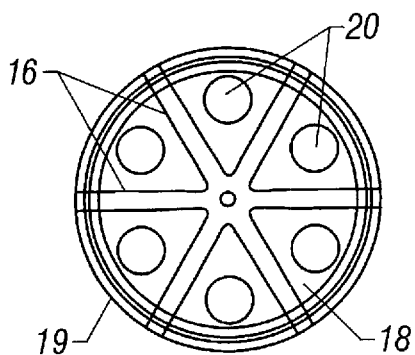
FIG. 6
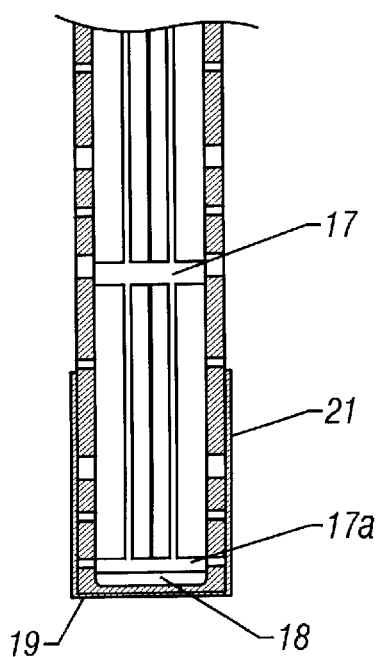
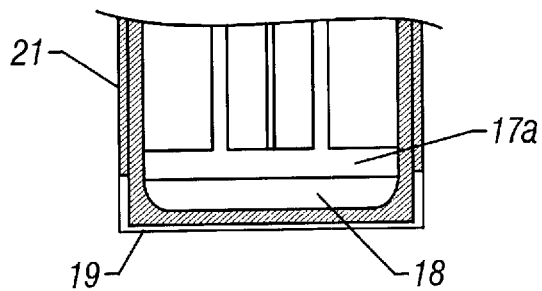
FIG. 5
FIG. 4

FILTER ELEMENT FOR A LIQUID FILTER USING A FILTRATION AID

FIELD OF THE INVENTION

This invention relates to a filter element for a liquid filter of the type employing a filter medium, such as a fabric bag or sleeve or other porous panel or wall through which liquid is to pass upon filtration, and wherein a filtration aid such as diatomaceous earth is used in combination with the filter medium to form a layer on the outside of the filter medium. Dirt then becomes deposited on the layer of filtration aid rather than directly on the filter medium.

More particularly the invention relates to a filter element of the type comprising a support frame and a fabric bag or sleeve covering in the frame as well as to the frame itself.

BACKGROUND TO THE INVENTION

Filters which employ a filter medium and a filtration aid in order to avoid premature blinding of the medium and thereby to extend the cycle time between back washing procedures, generally operate on the principle that when the filter is turned off, the filter aid and dirt collected thereby fall to the bottom of the container. When the filter is started up again, inlet fluid serves to stir up the filtration aid usually together with at least some dirt from the bottom of the filter container so that the filter aid becomes coated on to the filter medium once more.

During this process the filtration aid and dirt in the bottom of the container inflict wear on the filter medium, namely the fabric of the bag or sleeve. The severity of the wear on the bag or sleeve depends largely on the direction and velocity of the flow of incoming liquid which stirs up the mixture of dirt and filtration aid. It has now been found that, depending on the exact configuration, an inlet arrangement such as that described in my granted South African patent No 93/0761 can lead to undue wear on the bag or sleeve.

More particularly, the type of filter described in my said earlier South African Patent utilizes filter elements which are of an elongate construction and have a plastics injection moulded frame having, in cross-section, a number of longitudinally extending ribs radiating from a central axis and the outer edges of which support the fabric sleeve. The construction of the frame is dictated, to some extent, by the tool design and, as a consequence, the operatively lower end of each frame was heretofore moulded as a ring encircling the outer edges of the ribs. The end of the frame was left open in order to allow full fluid flow through the end of the sleeve.

This construction of the lower end of the frame is now believed by applicant to be at least partly responsible for excessive wear on the lower end of the sleeve which is experienced at least in some instances.

OBJECT OF THE INVENTION

It is accordingly an object of this invention to provide a filter element and a frame therefor which is better adapted to diminish or accommodate this abrasive effect on the fabric at the lower ends of the bags or sleeves which are in the immediate vicinity of the settled dirt and filtration aid when it is stirred up.

SUMMARY OF THE INVENTION

In accordance with this invention there is provided a liquid filter element frame comprising an elongate injection moulded body having a plurality of support ribs radiating from a central axis thereof and a support ring encircling the outer edges of the ribs at the operatively lower end thereof, the frame being characterized in that the ring has attached thereto an end disc having a smoothly contoured edge for supporting the lower end of a sleeve of filter fabric, in use.

Further features of the invention provides for the disc to have perforations coinciding with the spaces between adjacent ribs to provide for fluid flow through the disc; and for the elongate moulding to have support rings encircling the ribs at spaced positions along the length thereof.

The invention also provides a sleeve made of filter fabric and adapted to be used as a cover for the element frame defined above wherein the operatively lower end of the sleeve is made of a double layer of filter fabric.

A further feature of this aspect of the invention provides for the operatively upper end of the sleeve of filter fabric to also be made as a double layer of fabric. The purpose of the latter is to protect that region of the bag which is located uppermost and which is maintained in position by means of an elastomeric band, so that it does not become worn before the normal life of the sleeve has come to end.

In order that the invention may be more fully understood one embodiment of thereof will now be described with reference to the accompanying drawings.

BRIEF DESCRIPTION OF THE DRAWINGS

In the drawings:

FIG. 4 is a sectional elevation of one filter element according to the invention;

FIG. 5 is a similar but enlarged view of the operatively lower end of the filter element; and FIG. 6 is an end view of the frame showing the disc of this embodiment of the invention fitted to the end of the element frame.

DETAILED DESCRIPTION WITH REFERENCE TO THE DRAWINGS

Figure 1:
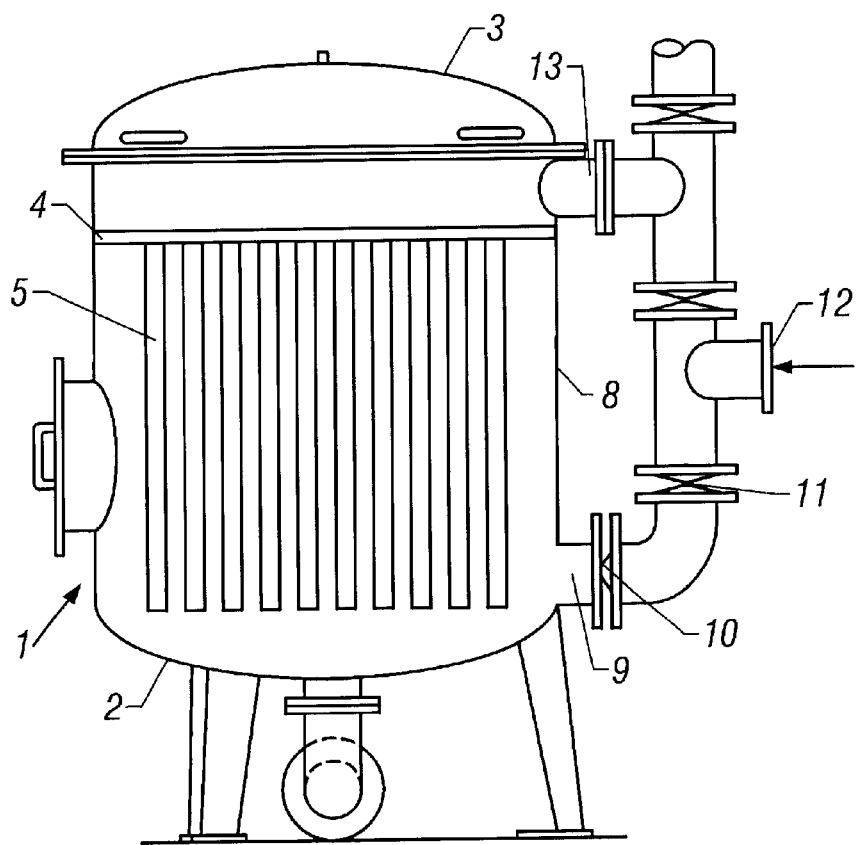
FIG. 1 is a schematic sectional elevation of a liquid filter assembly embodying the expedient of the invention.

In the embodiment of the invention illustrated in the drawings the invention is applied to filter elements for use in a liquid filter assembly comprising a container 1 of a circular cylindrical shape and having a concave lower end 2 and a correspondingly convex lid 3 removably secured thereto, Towards the upper end of the container is a transverse generally horizontal divider plate 4 which supports the upper ends of an array of generally vertical elongate filter elements 5 each of which has a filter medium in the form of a fabric sleeve 6 supported on a supporting frame 7 therefor.

Located in the side wall 8 of the container towards the bottom thereof is an inlet 9 fitted with a one way non-return valve 10 and connected through a control valve 11 to an inlet connection 12 for the liquid to be filtered.

The upper end of the container has an outlet 13 through the side wall thereof located above the level of the dividing wall 4.

In use, liquid will enter through the inlet 9; pass through the fabric filter medium of the sleeves; and thence up the filter elements 5 into the upper region of the container 1 and out through the outlet 13, In the type of filter under consideration the fabric filter medium supports, in the operative condition, a finely subdivided filtration aid which is typically diatomaceous earth.

At the end of a filtration cycle the diatomaceous earth and the dirt which has been trapped thereby fall to the bottom of the container and must be stirred up in a substantially even manner when the filter is next started up.

Figure 2:
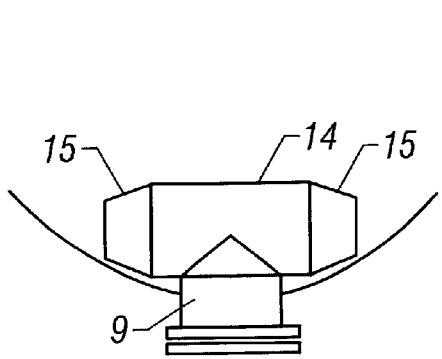
FIG. 2 is a schematic plan view of one form of inlet.

The inlet 9 may be directed radially inwardly and communicate, on the inside of the container, with a transverse duct 14. As shown in FIG. 2, this duct 14 could simply be connected in Tee-fashion to the inlet so that the axis of the duct extends in a substantially circumferential direction.

The outlet ends of the duct 14 may each be fitted with a cowl 15 which serves to direct the flow of liquid somewhat downwardly.

Figure 3:
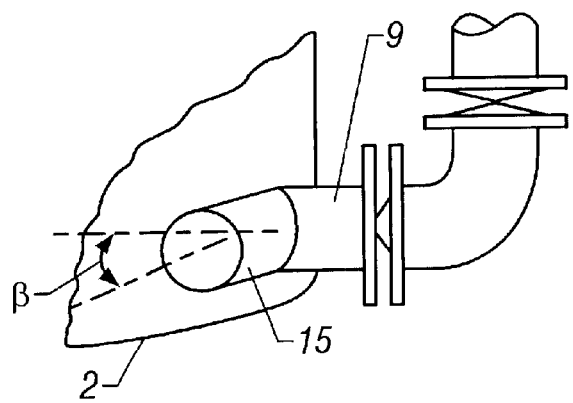
FIG. 3 is a schematic elevation of an inlet to a filter container.

If required, the axes of the outlet limbs of the manifold may be inclined downwardly towards of the bottom of the container and by an angle beta as illustrated in FIG. 3. This aspect of directing the flow of liquid is described more fully in my said earlier granted patent no 93/0761.

Turning now to the filter element provided by this invention, the injection moulded plastics frame 7 is elongate and has, in cross-section, six radiating ribs 16 the outer edges of which support the sleeve 6. The ribs 16 are interconnected at their outer edges by rings 17 encircling the ribs at spaced intervals along the length of the frame. The operatively lower end of the frame terminates in such a ring 17a.

In terms of the first aspect of this invention this ring has secured co-axially thereto a disc 18 made of injection moulded plastics material and having a rounded edge 19 as shown most clearly in FIG. 5. FIG. 6 illustrates the disc 18 in end view and shows holes 20 therethrough which correspond with the spaces between adjacent ribs 16. Thus flow of fluid through the end of the frame is permitted through these holes.

In terms of the second aspect of this invention, the bag six itself has a doubled over region 21 at the operatively lower end of the sleeve and another doubled over portion 22 at the upper end thereof. The latter serves to avoid wear and tear at the region of the bag where an elastomeric band 23 holds the bag on to an integral sleeve 24 at the operatively upper end of the frame.

The combination of the features described above, namely the disc secured to the end of the frame and providing a smooth wear resistant edge to the lower end of the frame, and the doubled over portions of the sleeve of filter material, serve to assist greatly in diminishing the wearing effect of the filter aid and dirt being stirred up at the commencement of each filtration cycle.

It will be understood that numerous variations may be made to the embodiments of the invention described above without departing from the scope hereof.

The invention therefore provides an extremely simple yet highly effective expedient for the purpose of diminishing wear of fabric filter bags or sleeves particularly towards their lower ends which are closest to the settled diatomaceous earth or other filtration aid at the start-up stage of a filtration cycle in a filter of the general type described.

What is claimed is:

1. A liquid filter element comprising:
   (a) a support frame comprising
       an elongate injection molded body having a plurality of support ribs radiating from a central axis thereof; and
       a plurality of encircling support rings spaced along said axis and attached to the support ribs at outer edges thereof, one of said support rings being located at an end of said body; and
   (b) an elongate filter sleeve of a filter fabric having a first closed end an opposed second end, the sleeve being adapted for use as a cover for the support frame;
       wherein the support frame has an end disc attached to said one support ring for supporting the closed end of he filter sleeve, the end disc having a smoothly contoured edge and perforations therethrough.

2. A liquid filter element as claimed in claim 1, in which the end disc of the support frame has a plurality of perforations coinciding with spaces between adjacent ribs to provide for fluid flow through the disc.

3. A liquid filter element as claimed in claim 2, in which a first end region of the filter sleeve, adjacent the closed end thereof, comprises a double layer of fabric.

4. A liquid filter element as claimed in claim 3, in which a second end region of the filter sleeve, adjacent the second end thereof, comprises a double layer of fabric.

* * * * *

UNITED STATES PATENT AND TRADEMARK OFFICE
CERTIFICATE OF CORRECTION

PATENT NO.   : 6,401,938 B1
DATED        : June 11, 2002
INVENTOR(S)  : Jonathan Schewitz It is certified that error appears in the above-identified patent and that said Letters Patent is hereby corrected as shown below:

Column 1,
Line 20, after "the" please insert -- filter --.

Column 2,
Line 50, after "thereto" please change "," to -- . --.
Line 66, after "13" please change "," to -- . --.

Column 4,
Line 18, after "comprising" please insert -- in combination --.
Line 27, after "closed end" please insert -- and --.
Line 31, before "filter", please change "he" to -- the --.

Signed and Sealed this

Twenty-sixth Day of November, 2002

Attest:

JAMES E. ROGAN
Attesting Officer                Director of the United States Patent and Trademark Office